United States Patent [19]
Chatterji et al.

[11] 4,455,169
[45] Jun. 19, 1984

[54] SALT WATER CEMENT SLURRIES AND WATER LOSS REDUCING ADDITIVES THEREFOR

[75] Inventors: Jiten Chatterji; Bobby G. Brake, both of Duncan, Okla.

[73] Assignee: Halliburton Company, Duncan, Okla.

[21] Appl. No.: 371,848

[22] Filed: Apr. 26, 1982

Related U.S. Application Data

[63] Continuation of Ser. No. 167,936, Jul. 14, 1980, abandoned.

[51] Int. Cl.³ .............................................. C04B 7/353
[52] U.S. Cl. ...................................... 106/93; 106/314
[58] Field of Search .................................. 106/93, 314

[56] References Cited

U.S. PATENT DOCUMENTS

| | | | |
|---|---|---|---|
| 2,852,402 | 9/1958 | Shell | 106/93 |
| 2,961,044 | 11/1960 | Shell | 106/93 |
| 3,528,832 | 9/1970 | Ericsson et al. | 106/93 |

*Primary Examiner*—James Poer
*Attorney, Agent, or Firm*—Thomas R. Weaver; G. Keith deBrucky

[57] ABSTRACT

Salt water cement slurries having low water loss when in contact with water permeable earth formations and additives for reducing water loss from salt water cement slurries are provided. The additives are comprised of very low molecular weight carboxymethylhydroxyethylcellulose polymers. Methods of using the additives are also provided.

12 Claims, No Drawings

SALT WATER CEMENT SLURRIES AND WATER LOSS REDUCING ADDITIVES THEREFOR

This is a continuation of application Ser. No. 167,936 filed July 14, 1980 now abandoned.

In the drilling and completing of oil, gas and water wells, cement slurries are commonly utilized for carrying out cementing procedures such as cementing casings in the well bores, sealing subterranean zones penetrated by the well bores, etc. In most cases, the cement slurries are pumped into the well bores and allowed to harden once in place in the well bores or desired zones in formations.

A variety of additives have been developed and utilized heretofore for improving the properties of cement slurries and bringing about desired results including additives for reducing water loss from such slurries while or after the slurries are placed. Excessive water loss from cement slurries can prevent proper hydration of the cement, and in cementing wells, excessive water loss while the slurries are being flowed through well bores can result in dehydration of the slurries to the point where bridging of the cement and other solids takes place in the well bores preventing completion of cement displacement, etc. While the water loss reducing additives utilized heretofore are effective in cement slurries formed with fresh water or water containing very low concentrations of salts therein, such additives are substantially ineffective in cement slurries containing high concentrations of salts, and particularly, in cement slurries which are saturated with salts. For example, a number of cellulose derivatives have been utilized to control fluid loss from cement slurries containing little or no salts. However, such heretofore used cellulose derivatives are substantially ineffective in reducing water loss from salt water cement slurries. In addition, other heretofore used fresh water cement slurry water loss reducing additives, such as polyacrylamides, polyethylene imines mixed with naphthalene sulfonic acid and poly-2-acrylamide-3-propylsulfonic acid salts are not effective in reducing water loss from salt water cement slurries.

By the present invention, water loss reducing additives for salt water cement slurries are provided which are effective in reducing water loss from the slurries over a broad temperature range. In addition, methods of using the additives and salt water cement slurries containing the additives are provided. The term "salt water" is used herein to mean sea water, brines and other aqueous solutions of salts including ammonium, alkali metal and alkaline earth metal halides, and nitrates having salt concentrations therein up to saturation. Salts other than those mentioned above can be tolerated in the cement slurries of this invention to some extent even though they may react with or alter the performance of the slurries, e.g., bicarbonates, phosphates and sulfates. The term "salt water cement slurry" is used herein to mean a cement slurry comprised of water, cement, one or more salts and other components or additives to bring about desired slurry properties or use results. The salt amounts or concentrations in the cement slurries set forth hereinafter are expressed in percentages by weight of the water in the cement slurries. The amounts of water loss reducing additives in the cement slurries set forth hereinafter are expressed in percentages by weight of dry cement in the slurries.

The water loss reducing additives for salt water cement slurries of the present invention are comprised of very low molecular weight carboxymethylhydroxyethylcellulose polymers. More specifically, the particular carboxymethylhydroxyethylcellulose polymers which are useful in accordance with this invention have a carboxymethyl degree of substitution (D.S.) in the range of from about 0.1 to about 0.7 and a ratio of moles of ethylene oxide to anhydroglucose unit (M.S.) in the range of from about 0.6 to about 2.8.

The carboxymethylhydroxyethylcellulose polymers are derived from the cellulose class represented as a series of anhydroglucose units as follows:

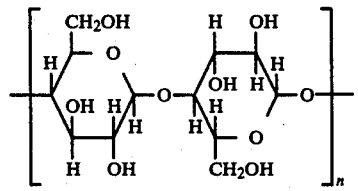

The portion of the above structural formula in brackets constitutes two anhydroglucose units, each having three reactive hydroxyl groups. n is an integer which gives the desired polymer molecular length. When the polymer is treated with sodium hydroxide and reacted with chloroacetic acid and ethylene oxide under controlled conditions, carboxymethylhydroxyethylcellulose is produced shown as follows:

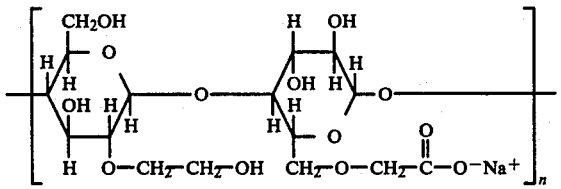

The sodium salt of carboxymethylhydroxyethylcellulose shown above has one of the side hydroxyl groups substituted by carboxymethyl, and therefore, the carboxymethyl degree of substitution (D.S.) is 0.5 per anhydroglucose unit. As stated above, the preferred carboxymethyl degree of substitution for the carboxymethylhydroxyethylcellulose used in accordance with this invention is in the range of from about 0.1 to about 0.7. At a carboxymethyl D.S. of less than about 0.1, the carboxymethylhydroxyethylcellulose has limited solubility in water and at a carboxymethyl D.S. above about 0.7, the carboxymethylhydroxyethylcellulose has too much anionic characteristic and causes a precipitate to be formed when combined with a cement slurry.

The above structural formula also shows that the ratio of moles of ethylene oxide to anhydroglucose unit (M.S.) is 1 mole for two units or 0.5. The preferred ethylene oxide M.S. for the carboxymethylhydroxyethylcellulose used in accordance with this invention is in the range of from about 0.6 to about 2.8. Carboxymethylhydroxyethylcellulose having an ethylene oxide M.S. outside the range given above does not give adequate water loss reducing properties to a salt water cement slurry.

The molecular length of the carboxymethylhydroxyethylcellulose polymers, i.e., the molecular weight of the polymers, must be very low in order to impart a low viscosity to a salt water cement slurry with which the polymers are combined. More specifically, the carboxymethylhydroxyethylcellulose polymers suitable for use in accordance with this invention have a very low molecular weight whereby a 1% by weight aqueous solution of the carboxymethylhydroxyethylcellulose at a temperature of 78° F. has a viscosity in the range of from about 10 to about 225 centipoises measured on a FANN viscometer at 300 rpm using a No. 1 spring, standard bob and standard sleeve. At molecular weights higher than those falling within the above given range, the viscosity of the salt water cement slurry to which the carboxymethylhydroxyethylcellulose is combined is too high whereby the resulting slurry cannot be pumped or otherwise handled. The FANN viscometer referred to herein is a FANN Model 35 viscometer manufactured by Fann Instrument Co. of Houston, Tex.

While the carboxymethylhydroxyethylcellulose polymers described above are effective in reducing water loss from salt water cement slurries, when the concentration of salts in the slurries is above about 18% by weight of water, the effectiveness of the polymers by themselves decreases. However, when a hydroxycarboxy acid is combined with the carboxymethylhydroxyethylcellulose polymers, the resulting additive is highly effective in reducing water loss from salt water cement slurries having high salt concentrations. More specifically, for salt water cement slurries having salt concentrations therein in the range of from about 18% by weight of water to saturation, an additive comprised of the carboxymethylhydroxyethylcellulose polymers described and a hydroxycarboxy acid present in the additive in an amount of about 50% of the weight of carboxymethylhydroxyethylcellulose in the additive is utilized. Particularly suitable hydroxycarboxy acids which can be used are gluconic acid, tartaric acid, lactic acid, citric acid, malic acid and mixtures of such acids. Of these, gluconic acid, tartaric acid and citric acid are preferred with citric acid being the most preferred.

A preferred water loss reducing additive for salt water cement slurries having salt concentrations below about 18% by weight of the slurries is comprised of carboxymethylhydroxyethylcellulose having a carboxymethyl D.S. in the range of from about 0.1 to about 0.7, an ethylene oxide M.S. in the range of from about 0.6 to about 2.8 and a molecular weight such that a 1% by weight aqueous solution of the carboxymethylhydroxyethylcellulose at a temperature of 78° F. has a viscosity in the range of from about 10 to about 225 centipoises measured on a FANN viscometer at 300 rpm using a No. 1 spring. The most preferred additive of this type is comprised of carboxymethylhydroxyethylcellulose having a carboxymethyl D.S. of about 0.4, an ethylene oxide M.S. of about 2.0 and a molecular weight wherein the viscosity of a 1% by weight aqueous solution is in the range of from about 10 to about 200.

A preferred water loss reducing additive for salt water cement slurries having salt concentrations therein in the range of from about 18% by weight of water to saturation is comprised of carboxymethylhydroxyethylcellulose having a carboxymethyl D.S. in the range of from about 0.1 to about 0.7, an ethylene oxide M.S. in the range of from about 0.6 to about 2.8, and a molecular weight such that a 1% by weight aqueous solution of said carboxymethylhydroxyethylcellulose at a temperature of 78° F. has a viscosity in the range of from about 10 to about 225 centipoises measured on a FANN viscometer at 300 rpm using a No. 1 spring, and a hydroxycarboxy acid selected from the group consisting of gluconic acid, tartaric acid, lactic acid, citric acid, malic acid and mixtures of such acids present in the additive in a weight amount of about 50% of the weight of carboxymethylhydroxyethylcellulose in the additive.

The most preferred additive of this type is comprised of carboxymethylhydroxyethylcellulose having a carboxymethyl D.S. of about 0.4, an ethylene oxide M.S. of about 2.0 and a molecular weight such that a 1% by weight aqueous solution thereof at a temperature of 78° F. has a viscosity in the range of from about 10 to about 200 centipoises measured on a FANN viscometer at 300 rpm using a No. 1 spring, and citric acid present in the additive in an amount of about 50% of the weight of carboxymethylhydroxyethylcellulose in the additive.

A preferred salt water cement slurry having low water loss when in contact with permeable earth formations of this invention is comprised of salt water, cement and a water loss reducing additive comprised of carboxymethylhydroxyethylcellulose having a carboxymethyl D.S. in the range of from about 0.1 to about 0.7, an ethylene oxide M.S. in the range of from about 0.6 to about 2.8 and a molecular weight such that a 1% by weight aqueous solution thereof at a temperature of 78° F. has a viscosity in the range of from about 10 to about 225 centipoises measured on a FANN viscometer at 300 rpm using a No. 1 spring.

Another preferred salt water cement slurry having low water loss when in contact with permeable earth formations is comprised of salt water, cement, a water loss reducing additive comprised of carboxymethylhydroxyethylcellulose having a carboxymethyl D.S. in the range of from about 0.1 to about 0.7, an ethylene oxide M.S. in the range of from about 0.6 to about 2.8 and a molecular weight such that a 1% by weight aqueous solution thereof at a temperature of 78° F. has a viscosity in the range of from about 10 to about 225 centipoises measured on a FANN viscometer at 300 rpm using a No. 1 spring, present in the slurry in an amount in the range of from about 0.2% to about 2.0% by weight of dry cement in the slurry, and a hydroxycarboxy acid selected from the group consisting of gluconic acid, tartaric acid, lactic acid, citric acid, malic acid and mixtures of such acids present in said slurry in an amount in the range of from about 0.1% to about 1.0% by weight of dry cement in the slurry.

The most preferred salt water cement slurry having low water loss is comprised of salt water, cement, and a water loss reducing additive comprised of carboxymethylhydroxyethylcellulose having a carboxymethyl D.S. of about 0.4, an ethylene oxide M.S. of about 2.0 and a molecular weight such that a 1% by weight aqueous solution thereof at a temperature of 78° F. has a viscosity of from about 10 to about 200 centipoises measured on a FANN viscometer at 300 rpm using a No. 1 spring, the carboxymethylhydroxyethylcellulose being present in the slurry in an amount in the range of from about 0.25% to about 1.8% by weight of dry cement in the slurry, and citric acid present in the slurry in an amount in the range of from about 0.1% to about 0.9% by weight of dry cement in the slurry.

In use of the water loss reducing additives of the present invention for reducing water loss from a salt water cement slurry used in cementing wells, the additive is combined with the salt water cement slurry prior to the use thereof. Preferably, the water loss reducing additive is dry blended with other dry components and added to the mixing water used to prepare the cement slurry. If the mixing water does not already contain salts, the salt or salts used are preferably also dry blended with other dry components and the mixture then combined with the mixing water. Once the slurry is thoroughly mixed, it is introduced into a well bore and/or subterranean formations penetrated thereby and allowed to set into a hard permeable mass. The water loss reducing additives and cement slurries including such additives are effective in substantially reducing water loss at temperatures over a broad temperature range, i.e., from about 100° F. to about 360° F.

As is well understood by those skilled in the art, the salt water cement slurries of this invention can include a variety of other components and additives to bring about desired results including solid fillers such as sand, set time retarders, accelerators, etc.

In order to facilitate a clear understanding of the additives, salt water cement slurries and methods of the present invention, the following examples are given.

EXAMPLE 1

Cement slurries are prepared using fresh water containing various concentrations of sodium chloride, cement and water loss reducing additives of this invention comprised of very low molecular weight carboxymethylhydroxyethylcellulose polymers (D.S. of 0.4, M.S. of 2.0, and a molecular weight such that a 1% by weight aqueous solution thereof at a temperature of 78° F. has a viscosity of from about 10 to about 200 centipoises measured on a FANN viscometer at 300 rpm using a No. 1 spring) and tartaric acid. The slurries and additives are mixed in a Waring Blender for 35 seconds at high speed. The surface mixing viscosities of the slurries are determined at 100° F., 120° F., 150° F. and 190° F. using a Halliburton consistometer as described in U.S. Pat. No. 2,122,765.

Fluid loss properties of the slurries are determined in accordance with API standard methods (API RP-10B) on a 326 mesh screen at 1000 psi at 100° F., 120° F., 150° F. and 190° F.

The results of these tests are given in Table I below.

TABLE I
PROPERTIES OF VARIOUS SALT WATER CEMENT SLURRIES CONTAINING CARBOXYMETHYLHYDROXYETHYLCELLULOSE (CMHEC)-TARTARIC ACID WATER LOSS REDUCING ADDITIVES

| Cement Used | Quantity of Cement in Slurry, Gallon Water/Sack | Quantity of CMHEC in Slurry, % by Weight Cement | Quantity of Tartaric Acid in Slurry, % by Weight Cement | Quantity of NaCl in Slurry, % by Weight Water | Temperature of Slurry, °F. | Initial Viscosity of Slurry, Bc | Fluid Loss, cc/30 Min. |
|---|---|---|---|---|---|---|---|
| Trinity Class H | 5.2 | 0.48 | 0.12 | 0 | 100 | 4 | 38 |
| Trinity Class H | 5.2 | 0.48 | 0.12 | 5 | 100 | 8 | 84 |
| Trinity Class H | 5.2 | 0.48 | 0.12 | 10 | 100 | 4 | 88 |
| Trinity Class H | 5.2 | 0.48 | 0.12 | 18 | 100 | 8 | 66 |
| Trinity Class H | 5.2 | 0.48 | 0.12 | saturated | 100 | 8 | 54 |
| Trinity Class H | 5.2 | 0.48 | 0.12 | 10 | 120 | 6 | 76 |
| Trinity Class H | 5.2 | 0.48 | 0.12 | saturated | 120 | 9 | 56 |
| Trinity Class H | 5.2 | 0.56 | 0.14 | 10 | 150 | 7 | 52 |
| Trinity Class H | 5.2 | 0.56 | 0.14 | saturated | 150 | 5 | 44 |
| Lone Star Class H | 5.2 | 0.8 | 0.2 | 0 | 190 | 9 | 42 |
| Lone Star Class H | 5.2[1] | 0.8 | 0.2 | 0 | 190 | 9 | 40 |
| Lone Star Class H | 5.2 | 0.8 | 0.2 | 5 | 190 | 9 | 48 |
| Lone Star Class H | 5.2 | 0.8 | 0.2 | 10 | 190 | 9 | 56 |
| Lone Star Class H | 5.2 | 0.8 | 0.2 | 18 | 190 | 8 | 52 |
| Lone Star Class H | 5.2 | 0.8 | 0.2 | 25 | 190 | 9 | 40 |
| Lone Star Class H | 5.2 | 0.8 | 0.2 | saturated | 190 | 9 | 28 |

[1]Synthetic sea water used as mixing water

From Table I it can be seen that the carboxymethylhydroxyethylcellulose-tartaric acid additives produce good surface mixing viscosities and fluid loss reduction in cement slurries containing various quantities of salts.

EXAMPLE 2

The procedure of Example 1 is repeated using water loss reducing additives comprised of the low molecular weight carboxymethylhydroxyethylcellulose polymers described and various hydroxycarboxy acids. The results of these tests are given in Table II below.

TABLE II
PROPERTIES OF SALT WATER CEMENT SLURRIES CONTAINING VARIOUS WATER LOSS REDUCING ADDITIVES

| Cement Used at Water Ratio of 5.2 Gallon Water/Sack | Quantity of CMHEC Slurry % by Weight Cement | Hydroxycarboxy Acid Used | Quantity of Hydroxycarboxy Acid in Slurry, % by Weight Cement | Quantity of NaCl in Slurry, % by Weight Water | Temperature of Slurry, °F. | Initial Viscosity of Slurry, cp | Fluid Loss, cc/30 Min. |
|---|---|---|---|---|---|---|---|
| Lone Star Class H | 0 | — | 0 | 0 | 100 | 10 | 1500 |
| Lone Star Class H | 0.4 | — | 0 | 0 | 100 | 4 | 66 |
| Lone Star Class H | 0.4 | — | 0 | 5 | 100 | 5 | 68 |
| Lone Star Class H | 0.4 | — | 0 | 10 | 100 | 5 | 84 |
| Lone Star Class H | 0.4 | — | 0 | 18 | 100 | 6 | 120 |
| Lone Star Class H | 0.4 | — | 0 | 25 | 100 | 7 | 233[1] |
| Lone Star Class H | 0.4 | — | 0 | saturated | 100 | 10 | 293[1] |
| Lone Star Class H | 0.4 | citric | 0.2 | 18 | 100 | 6 | 46 |
| Lone Star Class H | 0.4 | citric | 0.2 | 25 | 100 | 6 | 48 |
| Lone Star Class H | 0.4 | citric | 0.2 | saturated | 100 | 6 | 40 |
| Lone Star Class H | 0.5 | — | 0 | 18 | 100 | 7 | 86 |
| Lone Star Class H | 0.6 | — | 0 | 18 | 100 | 7 | 48 |

TABLE II-continued

PROPERTIES OF SALT WATER CEMENT SLURRIES CONTAINING VARIOUS WATER LOSS REDUCING ADDITIVES

| Cement Used at Water Ratio of 5.2 Gallon Water/Sack | Quantity of CMHEC Slurry % by Weight Cement | Hydroxycarboxy Acid Used | Quantity of Hydroxycarboxy Acid in Slurry, % by Weight Cement | Quantity of NaCl in Slurry, % by Weight Water | Temperature of Slurry, °F. | Initial Viscosity of Slurry, cp | Fluid Loss, cc/30 Min. |
|---|---|---|---|---|---|---|---|
| Lone Star Class H | 0 | — | 0 | 0 | 150 | 10 | 1500 |
| Lone Star Class H | 0.6 | — | 0 | 0 | 150 | 4 | 38 |
| Lone Star Class H | 0.6 | — | 0 | 5 | 150 | 4 | 44 |
| Lone Star Class H | 0.6 | — | 0 | 10 | 150 | 5 | 56 |
| Lone Star Class H | 0.6 | — | 0 | 18 | 150 | 7 | 60 |
| Lone Star Class H | 0.6 | citric | 0.2 | 18 | 150 | 5 | 48 |
| Lone Star Class H | 0.6 | citric | 0.2 | 25 | 150 | 6 | 38 |
| Lone Star Class H | 0.6 | citric | 0.2 | saturated | 150 | 6 | 36 |
| Lone Star Class H | 0.6 | — | 0 | saturated | 150 | 15 | 237[1] |
| Lone Star Class H | 0 | — | 0 | 0 | 190 | 10 | 1500 |
| Lone Star Class H | 0.8 | — | 0 | 0 | 190 | 8 | 32 |
| Lone Star Class H | 0.8 | — | 0 | 5 | 190 | 8 | 40 |
| Lone Star Class H | 0.8 | — | 0 | 10 | 190 | 8 | 42 |
| Lone Star Class H | 0.8 | — | 0 | 18 | 190 | 8 | 44 |
| Lone Star Class H | 0.8 | citric | 0.2 | 25 | 190 | 9 | 40 |
| Lone Star Class H | 0.8 | — | 0 | saturated | 190 | 40 | 270[1] |
| Lone Star Class H | 0.8 | citric | 0.2 | saturated | 190 | 10 | 38 |
| Lone Star Class H | 0.8 | tartaric | 0.2 | saturated | 190 | 10 | 32 |
| Lone Star Class H | 0.8 | lactic | 0.2 | saturated | 190 | 9 | 34 |
| Lone Star Class H | 0.8 | gluconic | 0.2 | saturated | 190 | 28 | 32 |
| Lone Star Class H[2] | 1.0 | citric | 0.2 | saturated | 250 | 12 | 44 |
| Lone Star Class H[2] | 1.0[3] | citric | 0.2 | saturated | 300 | 12 | 110 |
| Lone Star Class H[2] | 1.2[4] | citric | 0.2 | saturated | 360 | 14 | 80 |

[1]Calculated values of fluid loss
[2]35% by weight coarse sand included in slurry
[3]1.0% by weight retarder included in slurry
[4]1.2% by weight retarder included in slurry From Table II it can be seen that good fluid loss reduction is obtained using the additives of this invention at temperatures of from 100° F. to 360° F. Further, it can be seen that additives including hydroxycarboxy acids are more effective in salt water cement slurries containing salt concentrations above about 18% by weight of water than those containing CMHEC alone.

What is claimed is:

1. A cementing composition useful in cementing oil and gas wells and the like consisting essentially of:
   water;
   cement;
   salt in an amount above about 18% by weight of said water;
   carboxymethylhydroxyethylcellulose having a carboxymethyl D.S. in the range of from about 0.1 to about 0.7, an ethylene oxide M.S. in the range of from about 0.6 to about 2.8 and a molecular weight such that a 1% by weight aqueous solution thereof at a temperature of 78° F. has a viscosity in the range of from about 10 to about 225 centipoises measured on a FANN viscometer at 300 rpm using a No. 1 spring; and
   a hydroxycarboxy acid selected from the group consisting of gluconic acid, tartaric acid, lactic acid, citric acid, malic acid and mixtures of such acids.

2. The composition of claim 1 wherein said carboxymethylhydroxyethylcellulose has a carboxymethyl D.S. of about 0.4, an ethylene oxide M.S. of about 2.0 and a molecular weight such that said viscosity is in the range of from about 10 to about 225 centipoises.

3. The composition of claim 2 wherein said carboxymethylhydroxyethylcellulose is present in an amount of from about 0.2% to about 2.0% by weight of dry cement in the composition.

4. The composition of claim 2 wherein said hydroxycarboxy acid is present in an amount of from about 0.1% to about 1.0% by weight of dry cement in said composition.

5. The composition of claim 4 wherein said hydroxycarboxy acid is present in an amount of about 50% by weight of carboxymethylhydroxyethylcellulose in said composition.

6. The composition of claim 4 or 5 wherein the hydroxycarboxy acid is citric acid.

7. A method of cementing a conduit penetrating a permeable earthen formation by introducing a cementing composition into the space between said conduit and said formation and allowing said composition to harden, wherein the improvement comprises the use of a cementing composition consisting essentially of water; cement; salt in an amount above about 18% by weight of water present; carboxymethylhydroxyethylcellulose having a carboxymethyl D.S. in the range of from about 0.1 to about 0.7 an ethylene oxide M.S. in the range of from about 0.6 to about 2.8 and a molecular weight such that a 1% by weight aqueous solution thereof at a temperature of 78° F. has a viscosity in the range of from about 10 to about 225 centipoises measured on a FANN viscometer at 300 rpm using a No. 1 spring; and a hydroxycarboxy acid selected from the group consisting of gluconic acid, tartaric acid, lactic acid, citric acid, malic acid and mixtures of such acids.

8. The method of claim 7 wherein said carboxymethylhydroxyethylcellulose has a carboxymethyl D.S. of about 0.4, an ethylene oxide M.S. of about 2.0 and a molecular weight such that said viscosity is in the range of from about 10 to about 225 centipoises.

9. The method of claim 8 wherein said carboxymethylhydroxyethylcellulose is present in an amount of from about 0.2% to about 2.0% by weight of dry cement in the composition.

10. The method of claim 8 wherein said hydroxycarboxy acid is present in an amount of from about 0.1% to about 1.0% by weight of dry cement in said composition.

11. The method of claim 10 wherein said hydroxycarboxy acid is present in an amount of of about 50% by weight of carboxymethylhydroxyethylcellulose in said composition.

12. The method of claim 10 or 11 wherein the hydroxycarboxy acid is citric acid.

* * * * *

UNITED STATES PATENT AND TRADEMARK OFFICE
CERTIFICATE OF CORRECTION

Page 1 of 2

PATENT NO. : 4,455,169
DATED : June 19, 1984
INVENTOR(S) : Jiten Chatterji & Bobby G. Brake It is certified that error appears in the above-identified patent and that said Letters Patent is hereby corrected as shown below:

In Column 2, line 15 thru 23, delete

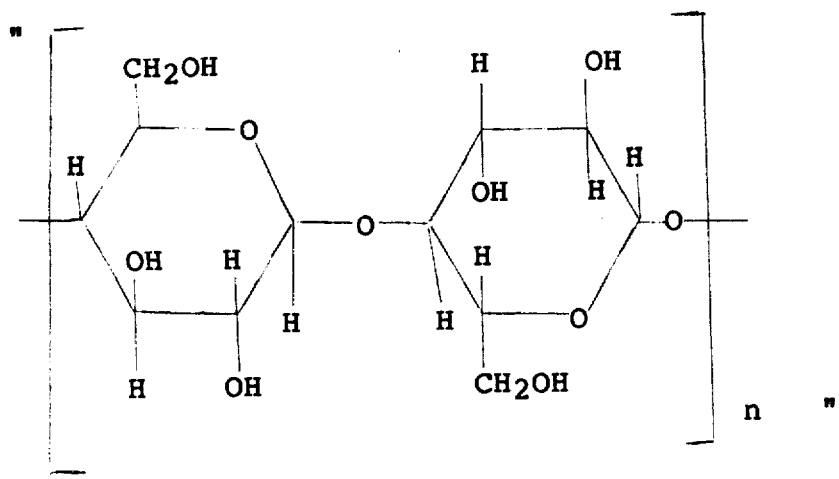

UNITED STATES PATENT AND TRADEMARK OFFICE
CERTIFICATE OF CORRECTION

PATENT NO. : 4,455,169

Page 2 of 2

DATED : June 19, 1984

INVENTOR(S) : Jiten Chatterji & Bobby G. Brake

It is certified that error appears in the above-identified patent and that said Letters Patent is hereby corrected as shown below:

and insert

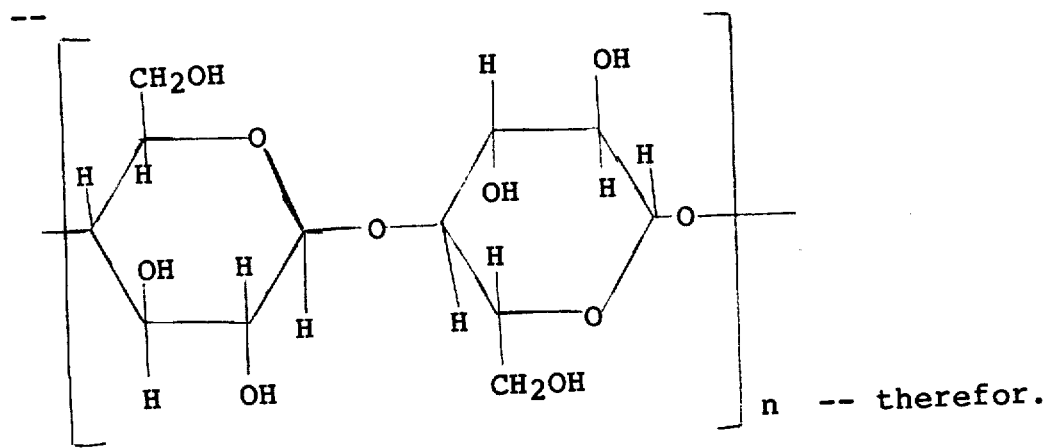

n -- therefor.

Signed and Sealed this

Twenty-third Day of October 1984

[SEAL]

Attest:

GERALD J. MOSSINGHOFF

Attesting Officer

Commissioner of Patents and Trademarks